(12) United States Patent
Martin et al.

(10) Patent No.: US 10,682,699 B2
(45) Date of Patent: Jun. 16, 2020

(54) SEMI-PASSIVE CONTROL OF SOLIDIFICATION IN POWDERED MATERIALS

(71) Applicant: HRL Laboratories, LLC, Malibu, CA (US)

(72) Inventors: John H. Martin, Ventura, CA (US); Tobias A. Schaedler, Oak Park, CA (US); Brennan Yahata, Los Angeles, CA (US); Jacob M. Hundley, Newbury Park, CA (US); Jason A. Graetz, Calabasas, CA (US); Adam F. Gross, Santa Monica, CA (US); William Carter, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 311 days.

(21) Appl. No.: 15/209,903

(22) Filed: Jul. 14, 2016

(65) Prior Publication Data

US 2017/0021417 A1    Jan. 26, 2017

Related U.S. Application Data

(60) Provisional application No. 62/192,568, filed on Jul. 15, 2015.

(51) Int. Cl.
*B33Y 70/00* (2020.01)
*B22F 3/10* (2006.01)
(Continued)

(52) U.S. Cl.
CPC .......... *B22F 3/1028* (2013.01); *B29C 64/153* (2017.08); *B33Y 10/00* (2014.12);
(Continued)

(58) Field of Classification Search
None
See application file for complete search history.

(56) References Cited

U.S. PATENT DOCUMENTS

| 5,305,726 A | 4/1994 | Scharman et al. |
| 5,340,012 A | 8/1994 | Beeferman et al. |

(Continued)

FOREIGN PATENT DOCUMENTS

| JP | 2011054892 A | 3/2011 |
| KR | 1020080105250 A | 12/2008 |
| WO | 2005017220 A1 | 2/2005 |

OTHER PUBLICATIONS

International Search Report and Written Opinion (ISA/KR), PCT/US2016/042388, dated Oct. 25, 2016.
(Continued)

*Primary Examiner* — Adam Krupicka
(74) *Attorney, Agent, or Firm* — O'Connor & Company

(57) ABSTRACT

Disclosed herein are surface-functionalized powders which alter the solidification of the melted powders. Some variations provide a powdered material comprising a plurality of particles fabricated from a first material, wherein each of the particles has a particle surface area that is continuously or intermittently surface-functionalized with nanoparticles and/or microparticles selected to control solidification of the powdered material from a liquid state to a solid state. Other variations provide a method of controlling solidification of a powdered material, comprising melting at least a portion of the powdered material to a liquid state, and semi-passively controlling solidification of the powdered material from the liquid state to a solid state. Several techniques for semi-passive control are described in detail. The methods may further include creating a structure through one or more techniques selected from additive manufacturing, injection
(Continued)

molding, pressing and sintering, capacitive discharge sintering, or spark plasma sintering.

11 Claims, 13 Drawing Sheets

(51) Int. Cl.
B33Y 10/00 (2015.01)
B29C 64/153 (2017.01)
B22F 1/02 (2006.01)
B22F 1/00 (2006.01)

(52) U.S. Cl.
CPC ............ *B33Y 70/00* (2014.12); *B22F 1/0018* (2013.01); *B22F 1/025* (2013.01); *B22F 2998/10* (2013.01); *B22F 2999/00* (2013.01); *Y02P 10/295* (2015.11)

(56) References Cited

U.S. PATENT DOCUMENTS

| 5,372,845 | A | * | 12/1994 | Rangaswamy | B22F 9/04 427/216 |
|---|---|---|---|---|---|
| 5,462,712 | A | | 10/1995 | Langan et al. | |
| 6,024,915 | A | * | 2/2000 | Kume | B22F 1/02 419/35 |
| 6,071,628 | A | | 6/2000 | Seals et al. | |
| 6,254,757 | B1 | | 7/2001 | Lashmore et al. | |
| 6,368,427 | B1 | | 4/2002 | Sigworth | |
| 9,238,877 | B2 | | 1/2016 | Krause et al. | |
| 2002/0136884 | A1 | | 9/2002 | Oechsner | |
| 2003/0077473 | A1 | | 4/2003 | Bretschneider et al. | |
| 2003/0104147 | A1 | | 6/2003 | Bretschneider et al. | |
| 2005/0238528 | A1 | | 10/2005 | Lin et al. | |
| 2006/0065330 | A1 | | 3/2006 | Cooper et al. | |
| 2010/0288243 | A1 | | 11/2010 | Kaburagi et al. | |
| 2012/0135142 | A1 | | 5/2012 | Yang et al. | |
| 2012/0315399 | A1 | | 12/2012 | Feng et al. | |
| 2013/0012643 | A1 | | 1/2013 | Monsheimer et al. | |
| 2013/0146041 | A1 | | 6/2013 | Hijii et al. | |
| 2013/0152739 | A1 | | 6/2013 | Li et al. | |
| 2015/0252451 | A1 | | 9/2015 | Al-Aqeeli et al. | |
| 2015/0337423 | A1 | | 11/2015 | Martin et al. | |
| 2017/0016095 | A1 | | 1/2017 | Karlen et al. | |
| 2017/0252851 | A1 | | 9/2017 | Fulop et al. | |

OTHER PUBLICATIONS

Chen et al., "Rapid control of phase growth by nanoparticles," Nature Communications 5:3879 DOI: 10.1038/ncomms4879.

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 (2016) 909-917.

Martin et al., "3D printing of high-strength aluminium alloys" Nature, vol. 549, Sep. 21, 2017.

* cited by examiner

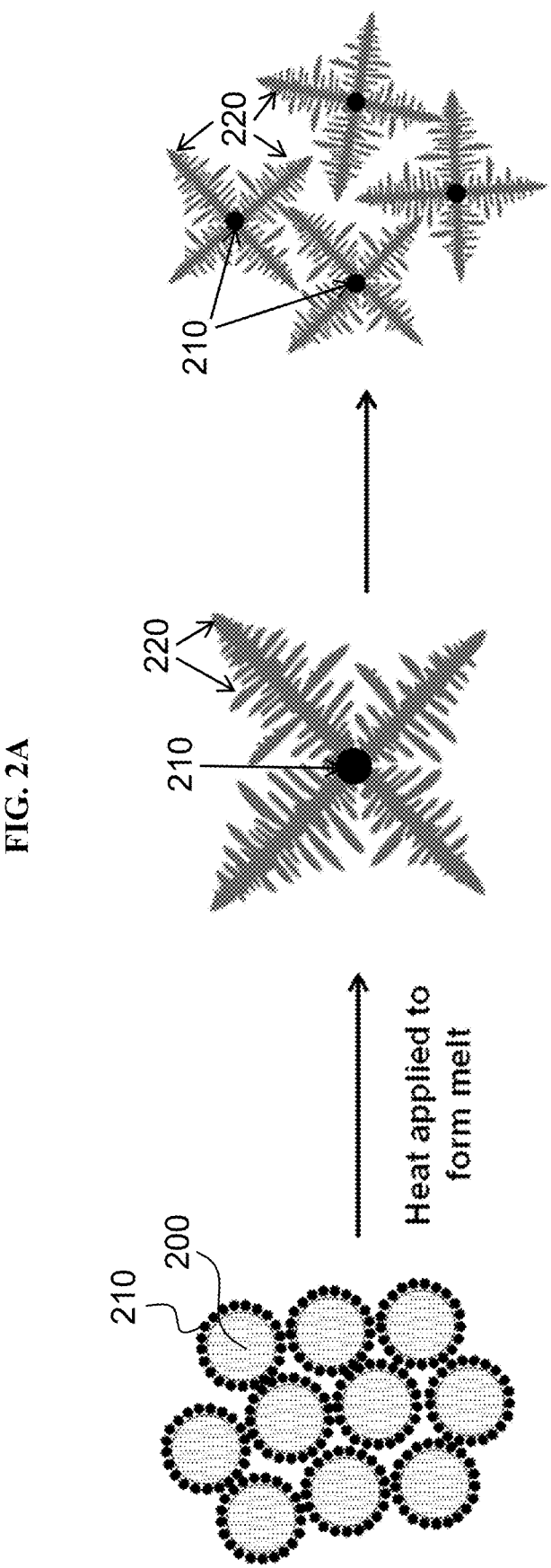

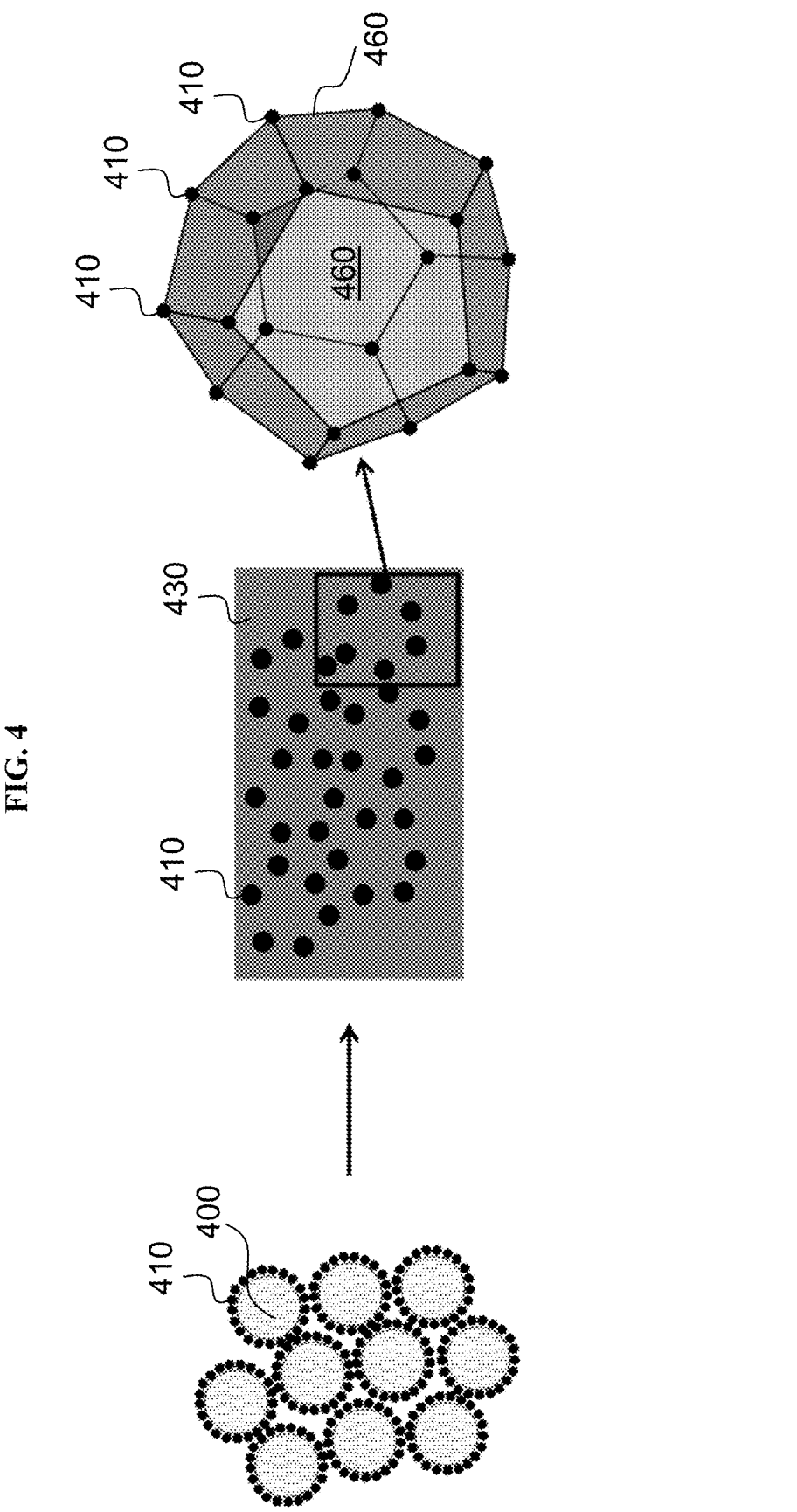

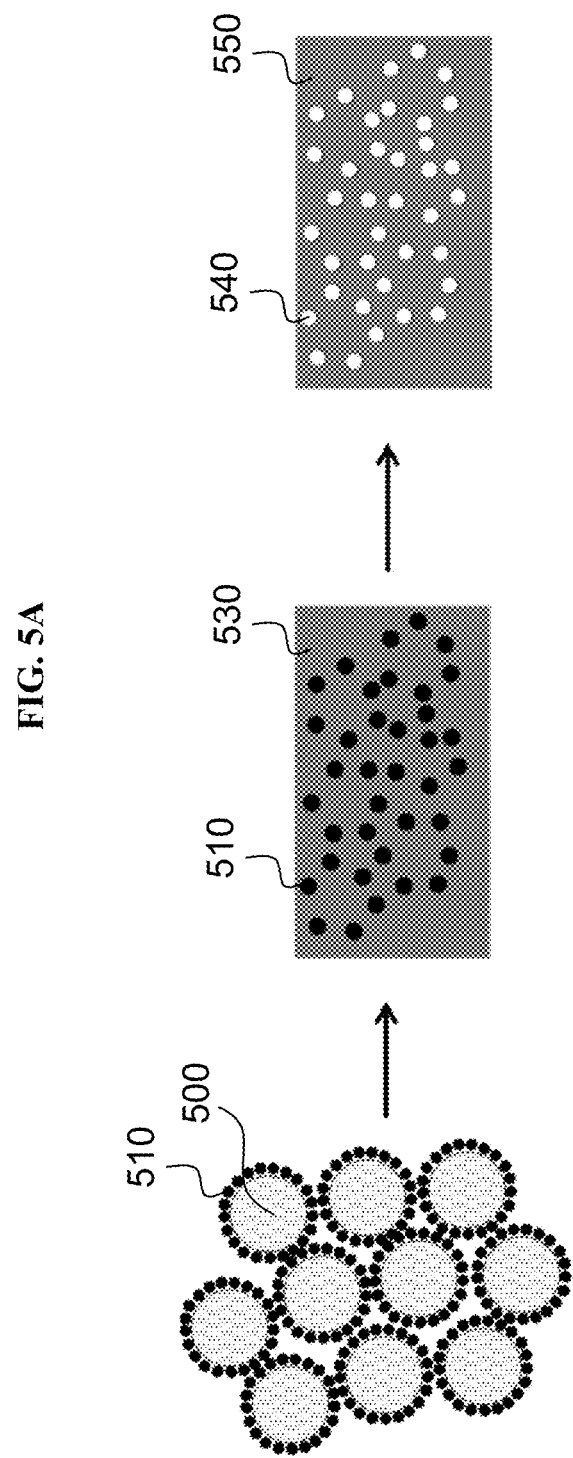

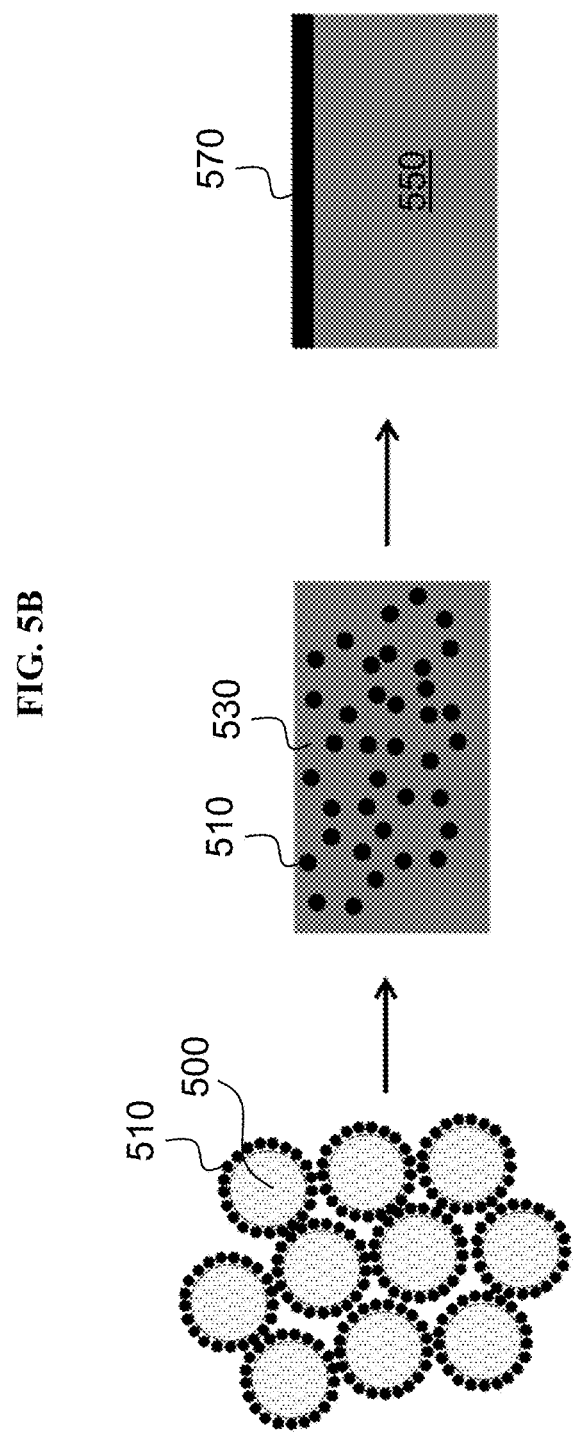

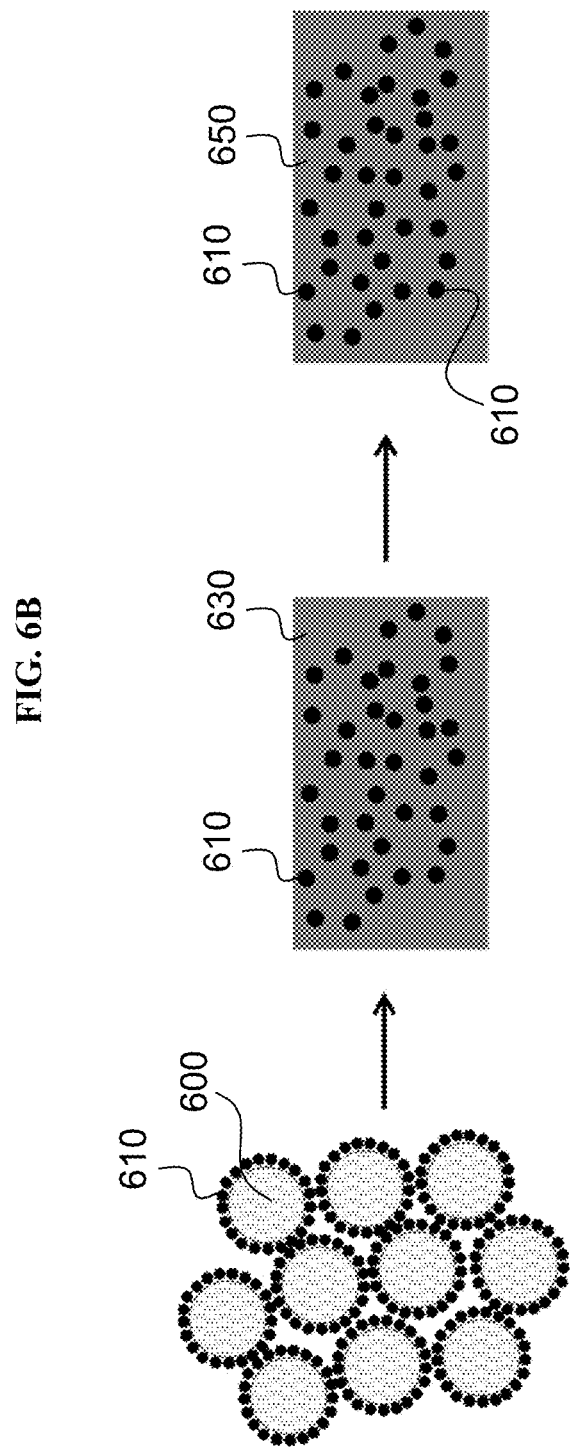

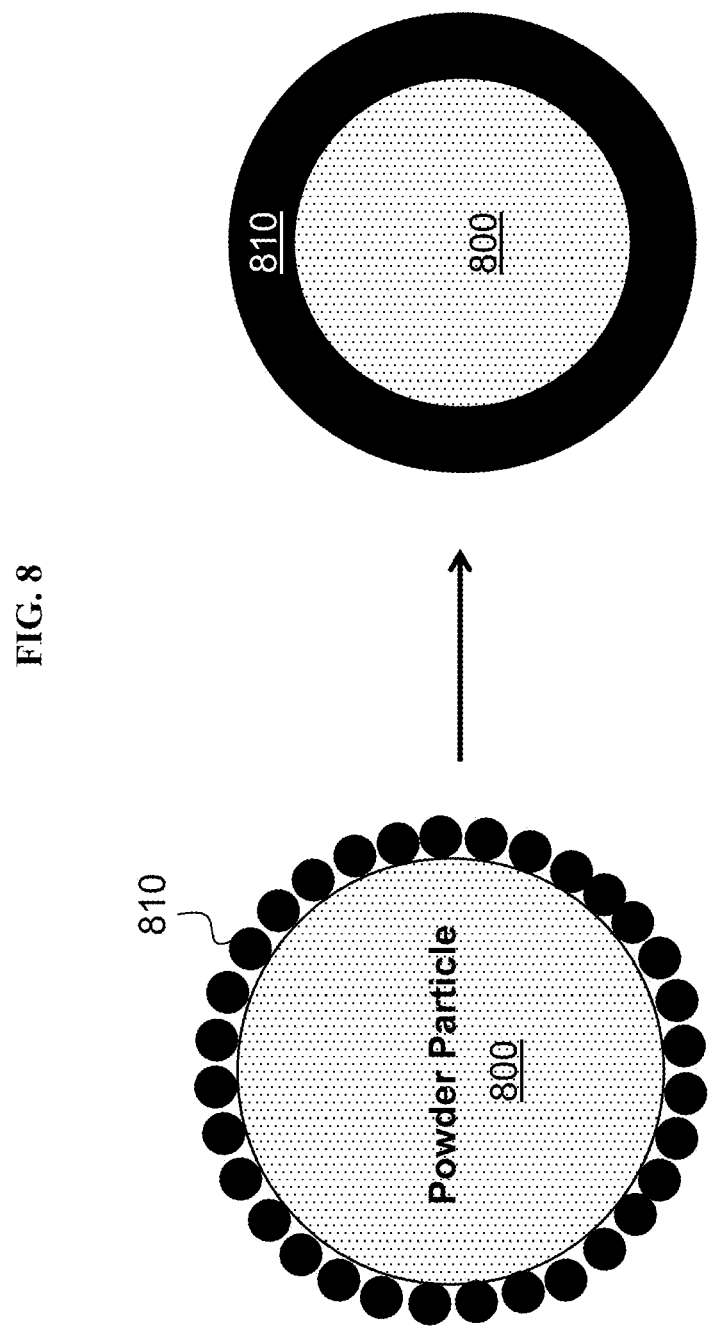

SEMI-PASSIVE CONTROL OF SOLIDIFICATION IN POWDERED MATERIALS

PRIORITY DATA

This patent application is a non-provisional application with priority to U.S. Provisional Patent App. No. 62/192,568, filed Jul. 15, 2015, which is hereby incorporated by reference herein.

FIELD OF THE INVENTION

The present invention generally relates to powdered materials, objects containing such powdered materials, and methods of making and using the same.

BACKGROUND OF THE INVENTION

Powder processing of metals includes capacitive discharge sintering, direct metal laser melting, electron beam melting, and other techniques. These processes have been used to create near net shape parts, and occasionally to control microstructure. This microstructure control is limited to grain size and grain orientation control. This control is all dependent on heat input. What is desired is to control nucleation and growth kinetics within the structure independent of, or in conjunction with, thermal input.

Prior art exists in which nanoparticles are used in melts to help seed crystallization. This is usually accomplished by adding nanoparticles into a molten alloy, physically distributing them, and then casting the resulting material. These nanoparticles are generally ceramic because they must be added and mixed in the melt. Metal particles and certain desirable ceramic particles would likely be dissolved and therefore cannot be used in this prior-art process. The microstructures which develop during such processing can be easily attributed to the casting process. The microstructures have nanoparticles segregated to the interdendritic regions. See, for example, Chen et al., "Rapid Control of Phase Growth by Nanoparticles," *Nature Communications*, 5:3879, May 2014; and Xu et al., "Theoretical Study and Pathways for Nanoparticle Capture during Solidification of Metal Melt," *Journal of Physics: Condensed Matter*, 24 (2012) 255304.

There are no known methods to develop three-dimensional nanoparticle architectures within metal microstructures. These architectures could significantly improve material properties by impeding, blocking, or redirecting dislocation motion in specific directions. This could be used to control failure mechanisms well beyond anything available in isotropic or anisotropic materials today.

Generally, improved methods of controlling solidification in powder materials, and compositions suitable for such methods, are needed. Preferably, the control of solidification does not require active, dynamic adjustment of reaction parameters during the solidification process.

SUMMARY OF THE INVENTION

The present invention addresses the aforementioned needs in the art, as will now be summarized and then further described in detail below.

Some variations provide a powdered material comprising a plurality of particles, wherein the particles are fabricated from a first material, and wherein each of the particles has a particle surface area that is surface-functionalized with a second material containing nanoparticles and/or microparticles selected to control solidification of the powdered material from a liquid state to a solid state. The surface functionalization may be continuous or intermittent (i.e. discontinuous across the surface).

In some embodiments, the powdered material is characterized in that on average at least 1% or at least 10% of the particle surface area is surface-functionalized with the nanoparticles and/or the microparticles.

The particles may be present as a loose powder, a paste, a suspension, a green body, or a combination thereof. The particles may have an average particle size from about 1 micron to about 1 centimeter. In some embodiments, the first material is selected from the group consisting of ceramic, metal, polymer, glass, and combinations thereof.

The nanoparticles and/or microparticles have an average maximum particle dimension from about 1 nanometer to about 100 microns. In some embodiments, the average maximum particle dimension is less than 100 nanometers. In these or other embodiments, the nanoparticles and/or microparticles have an average minimum particle dimension from about 1 nanometer to about 1 micron, such as less than 100 nanometers.

The nanoparticles and/or microparticles may be fabricated from a second material selected from the group consisting of metal, ceramic, polymer, carbon, and combinations thereof. The first material and the second material may compositionally be the same or different.

Other variations provide a method of controlling solidification of a powdered material, the method comprising:

providing a powdered material comprising a plurality of particles, wherein the particles are fabricated from a first material, and wherein each of the particles has a particle surface area that is surface-functionalized with a second material containing nanoparticles and/or microparticles;

melting at least a portion of the powdered material to a liquid state; and semi-passively controlling solidification of the powdered material from the liquid state to a solid state.

The particles, prior to the melting, may be present as a loose powder, a paste, a suspension, a green body, or a combination thereof, for example. In some embodiments, at least 2 vol % or at least 10 vol % of the powdered material is melted to form the liquid state.

The particles of first material may have an average particle size from about 1 micron to about 1 centimeter. The first material may be selected from the group consisting of ceramic, metal, polymer, glass, and combinations thereof. The second material (nanoparticles and/or microparticles) may be fabricated from a selected from the group consisting of metal, ceramic, polymer, carbon, and combinations thereof.

There are various types of semi-passive control of solidification. In some embodiments, semi-passively controlling solidification includes nucleation control. In these or other embodiments, semi-passively controlling solidification includes thermodynamic control. In these or other embodiments, semi-passively controlling solidification includes thermal conductivity control. In certain embodiments, semi-passively controlling solidification includes eutectic or peritectic reaction control. In any of these or other embodiments, semi-passively controlling solidification includes rejection of contaminants reacted with the nanoparticles and/or microparticles.

In some embodiments, the solid state is a three-dimensional microstructure containing the nanoparticles and/or microparticles as inclusions distributed throughout the solid state.

In some embodiments, the solid state is a layered microstructure containing one or more layers comprising the nanoparticles and/or microparticles.

The method may further include creating a structure through one or more techniques selected from the group consisting of additive manufacturing, injection molding, pressing and sintering, capacitive discharge sintering, and spark plasma sintering. The present invention provides a solid object or article comprising a structure produced by a process comprising such a method.

Some variations provide a solid object or article comprising at least one solid phase (i) containing a powdered material as described, or (ii) derived from a liquid form of a powdered material as described. The solid phase may form from 0.25 wt % to 100 wt % of the solid object or article, for example.

Other variations of the invention provide a solid object or article comprising a continuous solid phase and a three-dimensional network of nanoparticle and/or microparticle inclusions distributed throughout the continuous solid phase, wherein the three-dimensional network blocks, impedes, or redirects dislocation motion within the solid object or article.

In some embodiments, the nanoparticle and/or microparticle inclusions are distributed uniformly throughout the continuous solid phase. The nanoparticle and/or microparticle inclusions may be present at a concentration from about 0.1 wt % to about 50 wt % of the solid object or article.

The nanoparticles and/or microparticles may have an average maximum particle dimension less than 100 nanometers, an average minimum particle dimension less than 100 nanometers, or both of these.

The solid phase may be fabricated from a first material selected from the group consisting of ceramic, metal, polymer, glass, and combinations thereof. The nanoparticles and/or microparticles may be fabricated from a second material selected from the group consisting of metal, ceramic, polymer, carbon, and combinations thereof. The second material may be the same as or different than the composition of the solid phase.

BRIEF DESCRIPTION OF THE DRAWINGS

The schematic drawings herein represent surface-functionalization patterns and final microstructures which may be achieved in embodiments of the invention. These drawings should not be construed as limiting in any way. It is also noted that illustrations contained in the drawings are not drawn to scale and various degrees of zooming-in are employed for purposes of understanding these embodiments.

FIG. 2A is a schematic illustration of semi-passive solidification control including nucleation control, in which nanoparticles act as nucleation sites which lead to equiaxed grains in the final solid material.

FIG. 4 is a schematic illustration of semi-passive solidification control in which a melt solidifies with limited movement of assembled nanoparticles, thereby allowing the nanoparticles to orient in a three-dimensional structure which repeats throughout the final solid material.

FIG. 5A is a schematic illustration of semi-passive solidification control including thermodynamic control, in which nanoparticles react in the melt and the reaction enthalpy is utilized to control heat flow during solidification.

FIG. 5B is a schematic illustration of semi-passive solidification control including thermodynamic control, in which nanoparticles or a reaction product thereof are driven to the surface, where vaporization removes heat from the system.

FIG. 6B is a schematic illustration of semi-passive solidification control including conductivity or emissivity control, in which nanoparticles remain distributed and change the conductivity of the melt and the final solid material.

FIG. 8 is a schematic illustration of surface melting of a functionalized powder particle, in which heat is applied and the nanoparticles react with the surface to form a melt in less than 100% of the particle volume.

DETAILED DESCRIPTION OF EMBODIMENTS OF THE INVENTION

Figure 1:
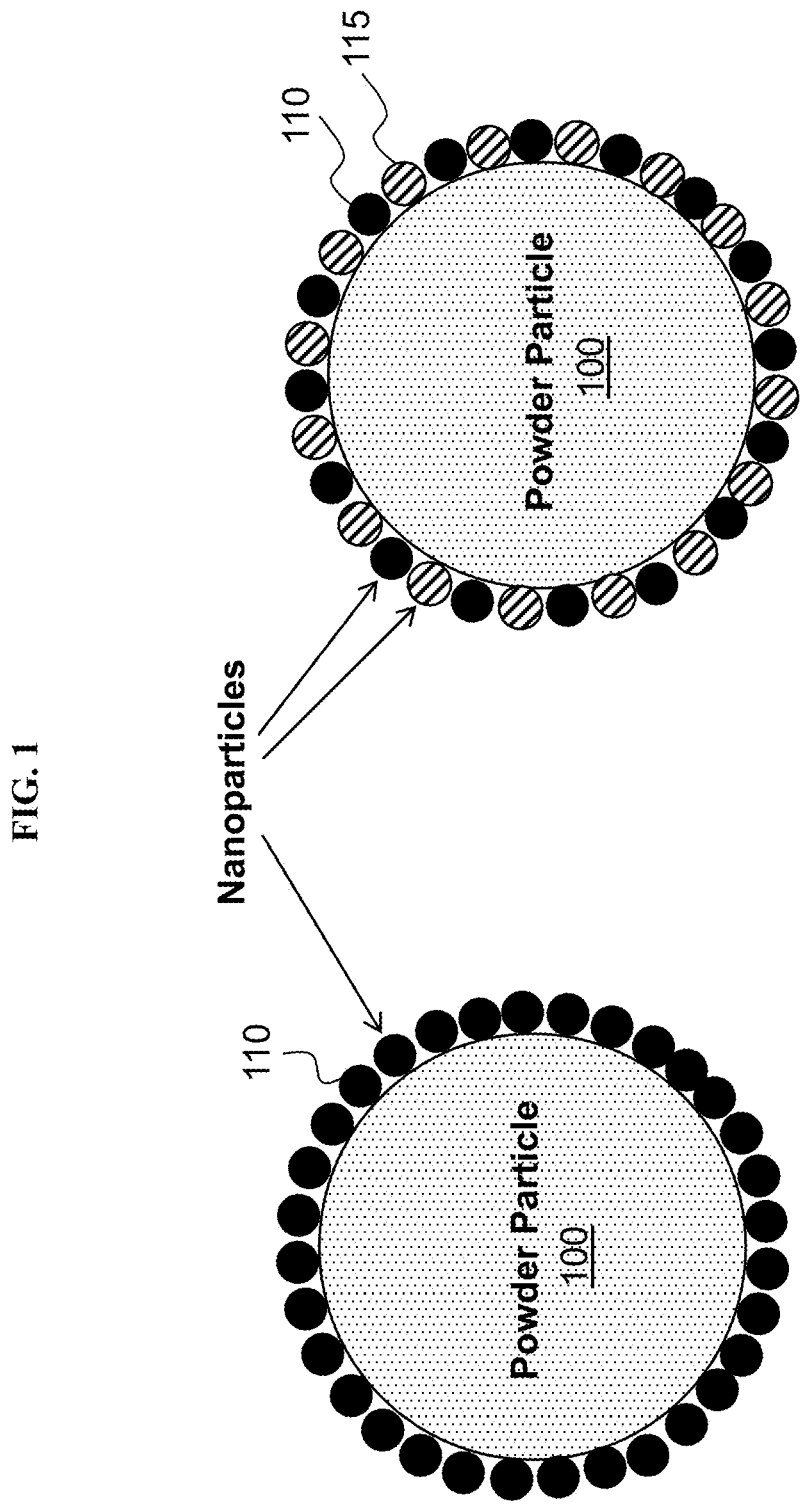
FIG. 1 is a schematic illustration of surface-functionalized powder particles with either a single type of nanoparticle or multiple types of nanoparticles coated onto the surface of the particles.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of this invention are predicated on the discovery of methods, compositions, and systems which can control the solidification of powder materials. This discovery is of particular interest in the field of additive manufacturing (also known as 3D printing) in which solidification is poorly understood. Controlling solidification can have a drastic impact on microstructure and thus material properties (e.g. strength, toughness). In some cases faster solidification is desirable; while in other cases slow solidification may produce the desired microstructure. In certain cases it is not desirable to fully melt the powder; but rather to melt and solidify only at the powder surface. This invention provides routes to control—in both time and space—solidification in materials, utilizing surface functionalization of the primary powder being processed.

In particular, some variations provide routes to controlled solidification of materials which are generally difficult or impossible to process otherwise. The principles disclosed herein may be applied to additive manufacturing as well as joining techniques, such as welding. Certain unweldable metals, such as high-strength aluminum alloys (e.g., aluminum alloys 7075, 7050, or 2199) would be excellent candidates for additive manufacturing but normally suffer from hot cracking. The methods disclosed herein allow these alloys to be processed with significantly reduced cracking tendency.

Proper control of solidification can lead to greater part reliability and enhanced yield. Some embodiments of the invention provide powder metallurgy—processed parts that are equivalent to machined parts. Some embodiments provide corrosion-resistant surface coatings that are formed during the part fabrication instead of as an extra step.

This disclosure describes control of nucleation and growth kinetics within the structure independent of, or in conjunction with, thermal input. This disclosure describes methods which incorporate phase and structure control to generate three-dimensional microstructural architecture. Methods for inclusion/contaminant removal are provided, as well as development of composite structures.

Variations of this invention are premised on controlling solidification through limiting or increasing thermal conductivity and/or radiation with the surroundings, utilizing enthalpies of formation and varying heat capacities to control thermal loads during solidification, and/or utilizing surface tension to control entrapment of desired species—or rejection of undesired species—in the final solidification product.

Some variations provide methods to control nanoparticle (or microparticle)/material segregation. When rapid solidification techniques are applied to powder processing, a unique microstructure may be developed, independent of the cast structure. Likewise, the configuration of the nanoparticles or microparticles around the particles prior to melting may introduce a three-dimensional nanoparticle architecture within the overall microstructure.

Embodiments of this invention provide three-dimensional nanoparticle architectures within metal microstructures. Not wishing to be bound by theory, these architectures may significantly improve the material properties by impeding, blocking, or redirecting dislocation motion in specific directions. This discovery could be used to control failure mechanisms beyond prior-art isotropic or anisotropic materials.

The present invention is not limited to metallic materials and can provide similar benefits with a significantly less difficult, more repeatable, and energy-efficient production method. The semi-passive nature of the process typically requires no alteration of existing tooling and can be employed in existing manufacturing settings.

Powder materials are the general feedstock for a powder metallurgy (or similar) process, including but not limited to additive manufacturing, injection molding, and press and sintered applications. As intended herein, "powder materials" refers to any powdered ceramic, metal, polymer, glass, or composite or combination thereof. In some embodiments, the powder materials are metals or metal-containing compounds, but this disclosure should not be construed as limited to metal processing. Powder sizes are typically between about 1 micron and about 1 mm, but in some cases could be as much as about 1 cm.

The powdered material may be in any form in which discrete particles can be reasonably distinguished from the bulk. The powder materials are not always observed as loose powders and may be present as a paste, suspension, or green body. A green body is an object whose main constituent is weakly bound powder material, before it has been melted and solidified. For instance, a filler rod for welding may consist of the powder material compressed into a usable rod.

Particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles are in the shape of rods. By "rod" is meant a rod-shaped particle or domain shaped like long sticks, dowels, or needles. The average diameter of the rods may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual nanorod shape.

The powder material particles may be anisotropic. As meant herein, "anisotropic" particles have at least one chemical or physical property that is directionally dependent. When measured along different axes, an anisotropic particle will have some variation in a measurable property. The property may be physical (e.g., geometrical) or chemical in nature, or both. The property that varies along multiple axes may simply be the presence of mass; for example, a perfect sphere would be geometrically isotropic while a cylinder is geometrically anisotropic. The amount of variation of a chemical or physical property may be 5%, 10%, 20%, 30%, 40%, 50%, 75%, 100% or more.

"Solidification" generally refers to the phase change from a liquid to a solid. In some embodiments, solidification refers to a phase change within the entirety of the powder volume. In other embodiments, solidification refers to a phase change at the surface of the particles or within a fractional volume of the powder material. In various embodiments, at least (by volume) 1%, 2%, 5%, 10%, 15%, 20%, 25%, 30%, 40%, 50%, 60%, 70%, 80%, 90%, 95%, 99%, or 100% of the powdered material is melted to form the liquid state. In certain embodiments, from about 1% to about 90% (by volume) of the powdered material is melted to form the liquid state. In certain embodiments, from about 2% to about 50% (by volume) of the powdered material is melted to form the liquid state. In certain embodiments, from about 50% to 100% (by volume) of the powdered material is melted to form the liquid state.

For a metal or mixtures of metals, solidification generally results in one or more solid metal phases that are typically crystalline, but sometimes amorphous. Ceramics also may undergo crystalline solidification or amorphous solidification. Metals and ceramics may form an amorphous region coinciding with a crystalline region (e.g., in semicrystalline materials). In the case of certain polymers and glasses, solidification may not result in a crystalline solidification. In the event of formation of an amorphous solid from a liquid, solidification refers to a transition of the liquid from above the glass-transition temperature to an amorphous solid at or below the glass-transition temperature. The glass-transition temperature is not always well-defined, and sometimes is characterized by a range of temperatures.

"Functionalization" or "surface functionalization" refers to a surface modification on the powdered materials, which modification significantly affects the solidification behavior (e.g., solidification rate, yield, selectivity, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having the surface-functionalization modifications. The surface modification maybe a surface-chemistry modification, a physical surface modification, or a combination thereof.

In some embodiments, the surface functionalization includes a nanoparticle coating and/or a microparticle coating. The nanoparticles and/or microparticles may include a metal, ceramic, polymer, or carbon, or a composite or combination thereof. The surface functionalization may include a particle assembly that is chemically or physically disposed on the surface of the powder materials.

FIG. 1 is a schematic illustration of surface-functionalized powder particles 100 with either a single type of nanoparticle 110 or multiple types of nanoparticles 110, 115 coated onto the surface of the particles 100. Methods of producing surface-functionalized powder materials, in some embodiments, are further discussed below. The powder particles 100 may include ceramic, metal, polymer, glass, or combinations thereof. Nanoparticles 110, 115 may include metal, ceramic, polymer, carbon, or combinations thereof. Specific material examples are described below.

Due to the small size of nanoparticles and their reactivity, the benefits provided herein may be possible with less than 1% surface area coverage. In the case of functionalization with a nanoparticle of the same composition as the base powder, a surface-chemistry change may not be detectible and can be characterized by topological differences on the surface, for example. Functionalization with a nanoparticle of the same composition as the base powder may be useful to reduce the melting point in order to initiate sintering at a lower temperature, for example.

In some embodiments, microparticles coat micropowders or macropowders. The micropowder or macropowder particles may include ceramic, metal, polymer, glass, or combinations thereof. The microparticles (coating) may include metal, ceramic, polymer, carbon, or combinations thereof. In the case of microparticles coating other micropowders or macropowders, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the coated powders.

In some embodiments, the surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, the coating may be continuous or discontinuous. The coating may have several characteristic features. In one embodiment, the coating may be smooth and conformal to the underlying surface. In another embodiment, the coating may be nodular. The nodular growth is characteristic of kinetic limitations of nucleation and growth. For example, the coating may look like cauliflower or a small fractal growing from the surface. These features can be affected by the underling materials, the method of coating, reaction conditions, etc.

A coating may or may not be in the form of nanoparticles or microparticles. That is, the coating may be derived from nanoparticles or microparticles, while discrete nanoparticles or microparticles may no longer be present. Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

As intended herein, "nanoparticles" refer to particles with the largest dimension between about 1 nm and 1000 nm. A preferred size of nanoparticles is less than 250 nm, more preferably less than 100 nm. As intended herein, "microparticles" refer to particles with the largest dimension between about 1 micron and 100 microns. Nanoparticles or microparticles may be metal, ceramic, polymer, carbon-based, or composite particles, for example. The nanoparticle or microparticle size may be determined based on the desired properties and final function of the assembly.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

Some variations provide a powdered material comprising a plurality of particles, wherein the particles are fabricated from a first material (e.g., ceramic, metal, polymer, glass, or combinations thereof), and wherein each of the particles has a particle surface area that is surface-functionalized (such as continuously or intermittently) with nanoparticles and/or microparticles selected to control solidification of the powdered material from a liquid state to a solid state. The nanoparticles and/or microparticles may include metal, ceramic, polymer, carbon, or combinations thereof.

In some embodiments, the powdered material is characterized in that on average at least 1%, 2%, 5%, 10%, 15%, 20%, 25%, 30%, 35%, 40%, 45%, 50%, or more of the particle surface area is surface-functionalized with the nanoparticles and/or the microparticles.

In some embodiments, the nanoparticles and/or microparticles are selected to control solidification of a portion of the powdered material, such as a region of powdered material for which solidification control is desired. Other regions containing conventional powdered materials, without nanoparticles and/or microparticles, may be present. In some embodiments, the nanoparticles and/or microparticles are selected to control solidification of a portion of each the particles (e.g., less than the entire volume of a particle, such as an outer shell).

Various material combinations are possible. In some embodiments, the powder particles are ceramic and the nanoparticles and/or microparticles are ceramic. In some embodiments, the powder particles are ceramic and the nanoparticles and/or microparticles are metallic. In some embodiments, the powder particles are polymeric and the nanoparticles and/or microparticles are metallic, ceramic, or carbon-based. In some embodiments, the powder particles are glass and the nanoparticles and/or microparticles are metallic. In some embodiments, the powder particles are glass and the nanoparticles and/or microparticles are ceramic. In some embodiments, the powder particles are ceramic or glass and the nanoparticles and/or microparticles are polymeric or carbon-based, and so on.

Exemplary ceramic materials for the powders, or the nanoparticles and/or microparticles, include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Exemplary metallic materials for the powders, or the nanoparticles and/or microparticles, include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Exemplary polymer materials for the powders, or the nanoparticles and/or microparticles, include (but are not limited to) thermoplastic organic or inorganic polymers, or thermoset organic or inorganic polymers. Polymers may be natural or synthetic.

Exemplary glass materials for the powders include (but are not limited to) silicate glasses, porcelains, glassy carbon, polymer thermoplastics, metallic alloys, ionic liquids in a glassy state, ionic melts, and molecular liquids in a glassy state.

Exemplary carbon or carbon-based materials for the nanoparticles and/or microparticles include (but are not limited to) graphite, activated carbon, graphene, carbon fibers, carbon nanostructures (e.g., carbon nanotubes), and diamond (e.g., nanodiamonds).

These categories of materials are not mutually exclusive; for example a given material may be metallic/ceramic, a ceramic glass, a polymeric glass, etc.

The selection of the coating/powder composition will be dependent on the desired properties and should be considered on a case-by-case basis. Someone skilled in the art of material science or metallurgy will be able to select the appropriate materials for the intended process, based on the information provided in this disclosure. The processing and final product configuration should also be dependent on the desired properties. Someone skilled in the art of material science, metallurgy, and/or mechanical engineering will be able to select the appropriate processing conditions for the desired outcome, based on the information provided in this disclosure.

In some embodiments, a method of controlling solidification of a powdered material comprises:

providing a powdered material comprising a plurality of particles, wherein the particles are fabricated from a first material, and wherein each of the particles has a particle surface area that is surface-functionalized with nanoparticles and/or microparticles;

melting at least a portion of the powdered material to a liquid state; and semi-passively controlling solidification of the powdered material from the liquid state to a solid state.

As intended in this description, "semi-passive control," "semi-passively controlling," and like terminology refer to control of solidification during heating, cooling, or both heating and cooling of the surface-functionalized powder materials, wherein the solidification control is designed prior to melting through selected functionalization and is not actively controlled externally once the melt-solidification process has begun. Note that external interaction is not necessarily avoided. In some embodiments, semi-passive control of solidification further includes selecting the atmosphere (e.g., pressure, humidity, or gas composition), temperature, or thermal input or output. These factors as well as other factors known to someone skilled in the art may or may not be included in semi-passive control.

Exemplary semi-passive control processes, enabled through surface functionalization as described herein, will now be illustrated.

One route to control nucleation is the introduction, into the liquid phase, of nanoparticles derived from a coating described above. The nanoparticles may include any material composition described above and may be selected based on their ability to wet into the melt. Upon melt initiation, the nanoparticles wet into the melt pool as dispersed particles which, upon cooling, serve as nucleation sites, thereby producing a fine-grained structure with observable nucleation sites in the cross-section. In some embodiments, the density of nucleation sites is increased, which may increase the volumetric freezing rate due to the number of growing solidification fronts and the lack of a nucleation energy barrier.

In an exemplary embodiment, ceramic nanoparticles, e.g. $TiB_2$ or $Al_2O_3$ nanoparticles, are coated onto aluminum alloy microparticles. The ceramic nanoparticles are introduced into an aluminum alloy melt pool in an additive manufacturing process. The nanoparticles then disperse in the melt pool and act as nucleation sites for the solid. The additional well-dispersed nucleation sites can mitigate shrinkage cracks (hot cracking). Shrinkage cracks typically occur when liquid cannot reach certain regions due to blockage of narrow channels between solidifying grains. An increase in nucleation sites can prevent formation of long, narrow channels between solidifying grains, because multiple small grains are growing, instead of few large grains.

In another exemplary embodiment, nanoparticles act as nucleation sites for a secondary phase in an alloy. The nanoparticles may comprise the secondary phase or a material that nucleates the secondary phase (due to similar crystal structures, for instance). This embodiment can be beneficial if the secondary phase is responsible for blocking interdendritic channels leading to hot cracking. By nucleating many small grains of the secondary phase, a large grain that might block the narrow channel between the dendrites can be avoided. Furthermore, this embodiment can be beneficial if the secondary phase tends to form a continuous phase between the grains of the primary phase, which promotes stress corrosion cracking. By providing additional nucleation sites for the secondary phase, this secondary phase may be broken up and interdispersed, preventing it from forming a continuous phase between grains of the primary alloy. By breaking up a secondary phase during solidification, there is the potential to more completely homogenize the material during heat treatment, which can decrease the likelihood of stress corrosion cracking (fewer gradients in the homogenized material). If the secondary phase is not continuous, long notches from corrosion are less likely.

In another embodiment of nucleation control, the functionalized surface may fully or partially dissolve in the melt and undergo a reaction with materials in the melt to form precipitates or inclusions, which may act in the same manner as the nanoparticles in the preceding paragraph. For example, titanium particles may be coated on an aluminum alloy particle, which upon melting would dissolve the titanium. However, on cooling the material undergoes a peritectic reaction, forming aluminum-titanium intermetallic ($Al_3Ti$) inclusions which would serve as nucleation sites.

In another embodiment, the coating may react with impurities to form nucleation sites. An example is a magnesium coating on a titanium alloy powder. Titanium has a very high solubility of oxygen (a common atmospheric contaminant), which can affect the overall properties. A coating of magnesium reacts within the melt, binding to dissolved oxygen which forms magnesium oxide (MgO) inclusions, promoting nucleation.

FIG. 2A is a schematic illustration of semi-passive solidification control including nucleation control, in which nanoparticles 210 (coated onto powder particles 200) act as nucleation sites which lead to equiaxed grains 220 in the final solid material. The powder particles 200 may include ceramic, metal, polymer, glass, or combinations thereof. Nanoparticles 210 may include metal, ceramic, polymer, carbon, or combinations thereof.

Figure 2B:
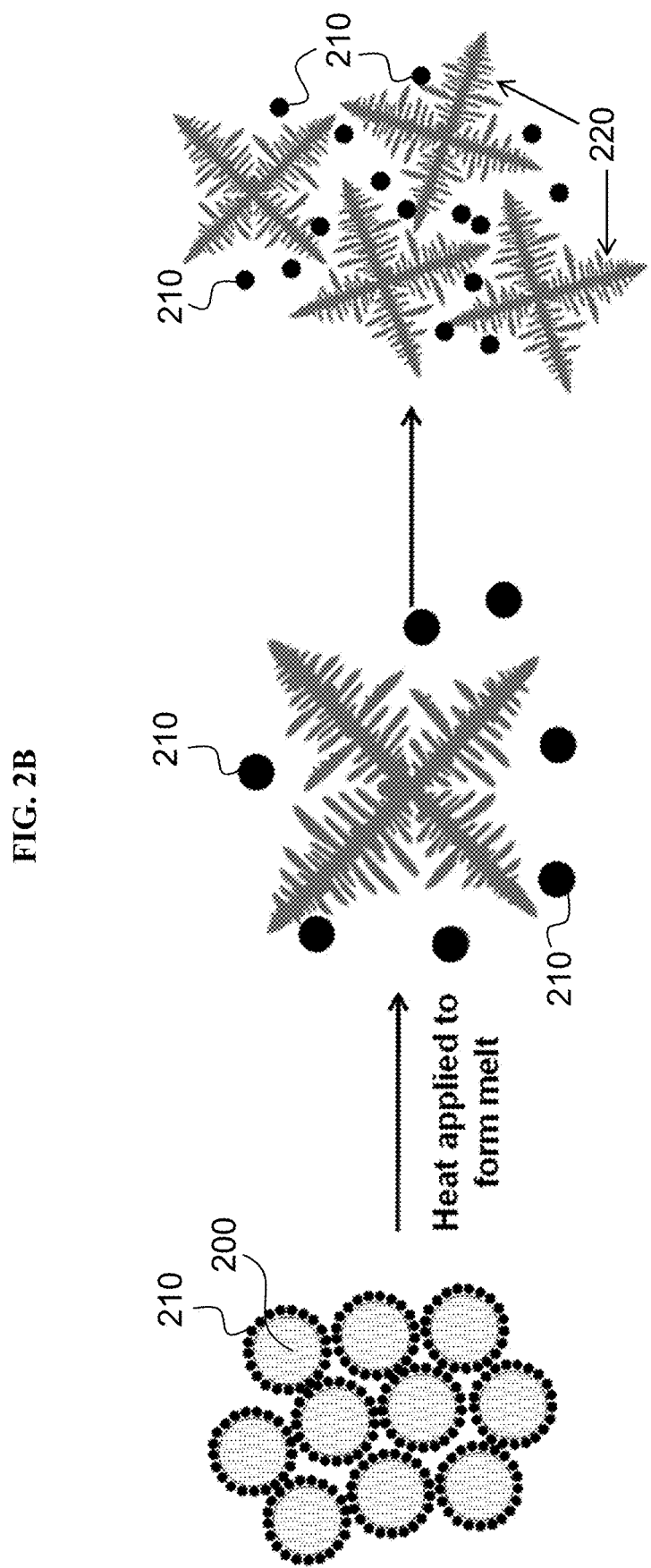
FIG. 2B is a schematic illustration of semi-passive solidification control including nucleation control, in which nanoparticles prevent runaway growth of individual dendrites, leading to equiaxed grains in the final solid material.

FIG. 2B is a schematic illustration of semi-passive solidification control including nucleation control, in which nanoparticles 210 prevent runaway growth of individual dendrites, leading to equiaxed grains 220 in the final solid material. Again, the powder particles 200 may include ceramic, metal, polymer, glass, or combinations thereof. Nanoparticles 210 may include metal, ceramic, polymer, carbon, or combinations thereof.

Nucleation control may include the use of ceramic particles. In some embodiments, the ceramic particles can be wet by the molten material, while in other embodiments, the ceramic particles cannot be wet by the molten material. The ceramic particles may be miscible or immiscible with the molten state. The ceramic particles may be incorporated into the final solid material. In some embodiments, the ceramic particles are rejected from the solid. Exemplary ceramic materials include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Nucleation control may include the use of metallic particles. In some embodiments, the metallic particles can be wet by the molten material. The metallic particles may form an alloy with the molten material through a eutectic reaction or peritectic reaction. The alloy may be an intermetallic compound or a solid solution. In some embodiments, the metallic particles cannot be wet by the molten material and cannot form an alloy with the molten material. Exemplary metallic materials include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Nucleation control may include the use of plastic particles. In some embodiments, the plastic particles can be wet by the molten material, while in other embodiments, the plastic particles cannot be wet by the molten material.

Nanoparticles promote surface growth of crystals that have good epitaxial fit. Nucleation on the surface of a nanoparticle is more likely when there is good fit between the crystal lattice parameters of the nanoparticles and the solidifying material. Nanoparticles may be selected to promote nucleation of a specific phase in the melt.

Generally, nucleation-promoting chemical reactions are dependent on the selected surface functionalization and on the heating (or cooling) parameters.

As nanoparticles or microparticles are organized on a particle surface under conditions for which rapid melting or near melting occurs and rapidly fuses the particles together with very little melt convection, the coating will not have the time or associated energy to diffuse away from its initial position relative to the other powders. This would in turn create a three-dimensional network structure of inclusions. Thus, a method is provided to control maximum grain size and/or to design a predictable microstructure. The microstructure is dependent on the initial powder size, shape, and packing configuration/density. Adjusting the coating and powder parameters allows control of this hierarchical structure. In some embodiments, these architectures significantly improve material properties by impeding, blocking, or redirecting dislocation motion in specific directions, thereby reducing or eliminating failure mechanisms.

Utilizing the appropriate functionalization, the heat flow during solidification may be controlled using appropriate heats of fusion or vaporization. In some embodiments, inclusions are pulled into the melt or reacted within the melt (as described above). In some embodiments, a coating is rejected to the surface of the melt pool. Utilizing a functionalization surface with a high vapor pressure at the desired melting point of the powder, vaporization would occur, resulting in a cooling effect in the melt which increases the freezing rate. As described above, magnesium on a titanium alloy may accomplish this, in addition to forming oxide inclusions. The effect of this is easily detectable when comparing non-functionalized powders to functionalized powders under identical conditions, as well as comparing the composition of feed material versus the composition of the final product.

In another embodiment, the opposite effect occurs. Some systems may require slower solidification times than can be reasonably provided in a certain production system. In this instance, a higher-melting-point material, which may for example be rejected to the surface, freezes. This releases the heat of fusion into the system, slowing the total heat flux out of the melt. Heat may also be held in the melt to slow solidification by incorporating a secondary material with a significantly higher heat capacity.

In another embodiment, the heat of formation is used to control heat flow during melt pool formation and/or solidification. For example, nickel microparticles may be decorated with aluminum nanoparticles. Upon supply of enough activation energy, the exothermic reaction of Ni and Al to NiAl is triggered. In this case, a large heat of formation is released (−62 kJ/mol) which may aid in melting the particles fully or partially. The resulting NiAl intermetallic is absorbed into the melt and stays suspended as a solid (a portion may be dissolved) due to its higher melting point, thereby acting as a nucleation site as well as having a strengthening effect on the alloy later.

Thermodynamic control of solidification may utilize nanoparticles/microparticles or surface coatings which undergo a phase transformation that is different from phase transformations in the base material. The phase transformations may occur at different solidus and/or liquidus temperatures, at similar solidus and/or liquidus temperatures, or at the same solidus and/or liquidus temperatures. The phase-transformed nanoparticles/microparticles or surface coatings may be incorporated into the final solid material, or may be rejected from the final solid material, or both of these. The phase-transformed nanoparticles/microparticles or surface coatings may be miscible or immiscible with the molten state. The phase-transformed nanoparticles/microparticles or surface coatings may be miscible or immiscible with the solid state.

Thermodynamic control of solidification may utilize nanoparticles/microparticles or surface coatings which vaporize or partially vaporize. For example, such coatings may comprise organic materials (e.g., waxes, carboxylic acids, etc.) or inorganic salts (e.g., $MgBr_2$, $ZnBr_2$, etc.)

Thermodynamic control of solidification may utilize nanoparticles/microparticles or surface coatings which release or absorb gas (e.g., oxygen, hydrogen, carbon dioxide, etc.).

Thermodynamic control of solidification may utilize nanoparticles/microparticles or surface coatings with different heat capacities than the base material.

In addition to controlling the energy within the system, it also is possible to control the rate at which heat leaves the system by controlling thermal conductivity or emissivity (thermal IR radiation). This type of control may be derived from a rejection to the surface or from the thermal conductivity of a powder bed during additive manufacturing, for instance. In one embodiment, the functionalization may reject to the surface a low-conductivity material, which may be the functionalization material directly or a reaction product thereof, which insulates the underlying melt and decreases the freezing rate. In other embodiments, a layer may have a high/low emissivity which would increase/decrease the radiative heat flow into or out of the system. These embodiments are particularly applicable in electron-beam systems which are under vacuum and therefore radiation is a primary heat-flow mechanism.

FIG. 5A is a schematic illustration of semi-passive solidification control including thermodynamic control, in which nanoparticles 510 react in the melt 530 and the reaction enthalpy is utilized to control heat flow during solidification. The powder particles 500 may include ceramic, metal, polymer, glass, or combinations thereof. Nanoparticles 510 may include metal, ceramic, polymer, carbon, or combinations thereof. After the nanoparticles 510 react in the melt 530, along with control of heat flow, new nanoparticles 540 may arise upon solidification to solid material 550.

FIG. 5B is a schematic illustration of semi-passive solidification control including thermodynamic control, in which nanoparticles 510 or a reaction product thereof are driven to the surface of the melt 530, where vaporization removes heat from the solidified material 550. Nanoparticles may be present at the surface as a layer 570, for example. Again, the powder particles 500 may include ceramic, metal, polymer, glass, or combinations thereof. Nanoparticles 510 may include metal, ceramic, polymer, carbon, or combinations thereof.

Additionally, in laser sintering systems, the emissivity of a rejected layer may be used to control the amount of energy input to the powder bed for a given wavelength of laser radiation. In another embodiment, the functionalized surface may be fully absorbed in the melt yet the proximity to other non-melted functionalized powders, such as additive manufacturing in a powder bed, may change the heat conduction out of the system. This may manifest itself as a low-thermal-conductivity base powder with a high-conductivity coating.

Figure 6A:
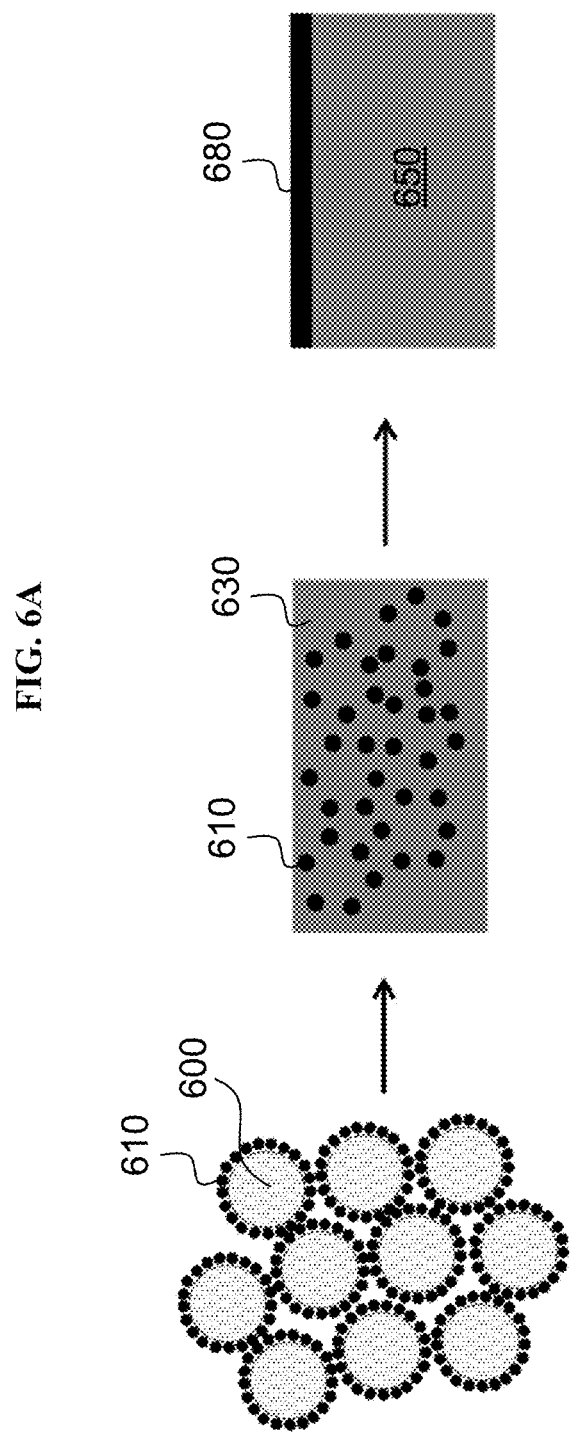
FIG. 6A is a schematic illustration of semi-passive solidification control including conductivity or emissivity control, in which nanoparticles driven to the surface form a layer with a different conductivity or emissivity than the underlying material.

FIG. 6A is a schematic illustration of semi-passive solidification control including conductivity or emissivity control, in which nanoparticles 610 driven to the surface of a melt 630 form a layer 680 with a different conductivity or emissivity than the underlying, solidified material 650. The powder particles 600 may include ceramic, metal, polymer, glass, or combinations thereof. Nanoparticles 610 may include metal, ceramic, polymer, carbon, or combinations thereof.

FIG. 6B is a schematic illustration of semi-passive solidification control including conductivity or emissivity control, in which nanoparticles 610 remain distributed in the melt 630 and change the conductivity of the melt 630 and the final solid material 650. Again, the powder particles 600 may include ceramic, metal, polymer, glass, or combinations thereof. Nanoparticles 610 may include metal, ceramic, polymer, carbon, or combinations thereof.

Thermal conductivity or emissivity control of solidification may utilize nanoparticles/microparticles or surface coatings which are higher in thermal conductivity compared to the base material. The nanoparticles/microparticles or surface coatings may be incorporated into the melt, or may be rejected, such as to grain boundaries or to the surface of the melt. The nanoparticles/microparticles or surface coatings may be miscible or immiscible with the molten state. The nanoparticles/microparticles or surface coatings may be miscible or immiscible with the final solid state.

Thermal conductivity or emissivity control of solidification may utilize nanoparticles/microparticles or surface coatings which are lower in thermal conductivity compared to the base material.

Thermal conductivity or emissivity control of solidification may utilize nanoparticles/microparticles or surface coatings which are higher in emissivity compared to the base material.

Thermal conductivity or emissivity control of solidification may utilize nanoparticles/microparticles or surface coatings which are lower in emissivity compared to the base material.

In some embodiments, the functionalization material may react with contaminants in the melt (e.g., Mg—Ti—O system). When the functionalization material is properly chosen, the reacted material may be selected such that the formed reaction product has a high surface tension with the liquid, such that it may be rejected to the surface. The rejected reaction product may take the form of an easily removable scale. Optionally, the rejected layer is not actually removed but rather incorporated into the final product. The rejected layer may manifest itself as a hard-facing carbide, nitride, or oxide coating, a soft anti-galling material, or any other functional surface which may improve the desired properties of the produced material. In some cases, the rejected surface layer may be of a composition and undergo a cooling regime which may result in an amorphous layer on the surface of the solidified material. These surface-rejected structures may result in improved properties related to, but not limited to, improved corrosion resistance, stress corrosion crack resistance, crack initiation resistance, overall strength, wear resistance, emissivity, reflectivity, and magnetic susceptibility.

Figure 7A:
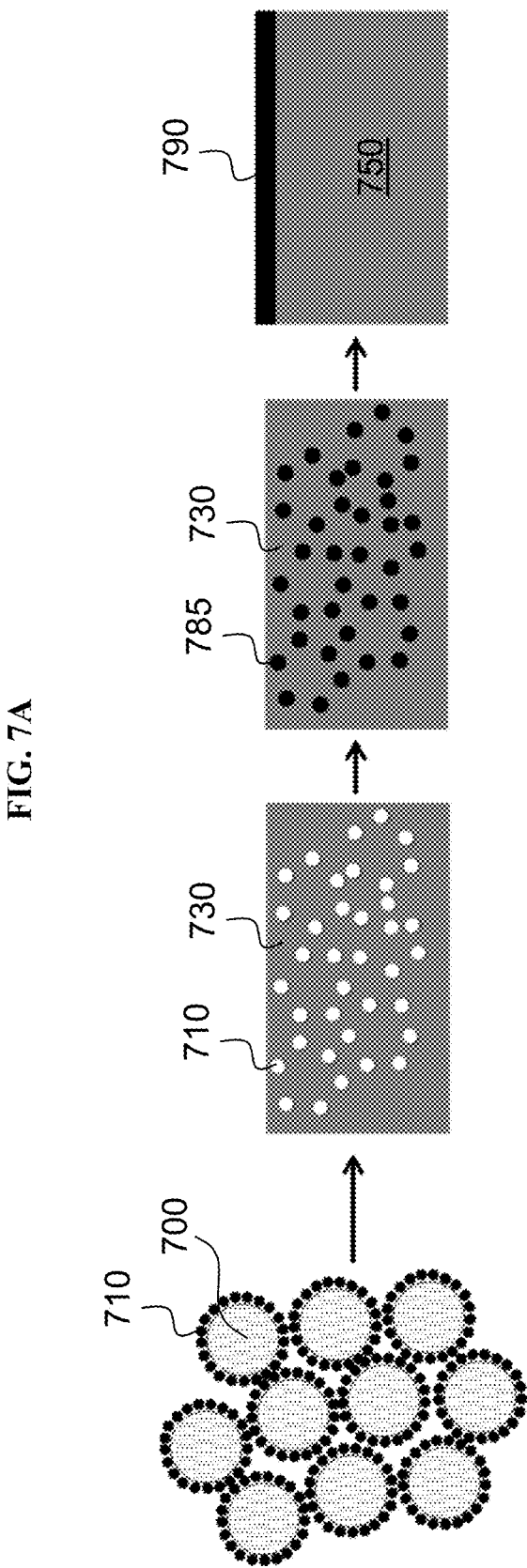
FIG. 7A is a schematic illustration of semi-passive solidification control including contaminant removal and rejection to the surface.

FIG. 7A is a schematic illustration of semi-passive solidification control including contaminant removal and rejection to the surface. The powder particles 700 may include ceramic, metal, polymer, glass, or combinations thereof. Nanoparticles 710 may include metal, ceramic, polymer, carbon, or combinations thereof. Nanoparticles 710 are distributed in a melt 730 and react with contaminants (not shown) from the melt 730, to form new nanoparticles/microparticles 785. The reacted contaminants may be rejected to the surface of the final material 750 as a surface layer 790, for example.

Figure 7B:
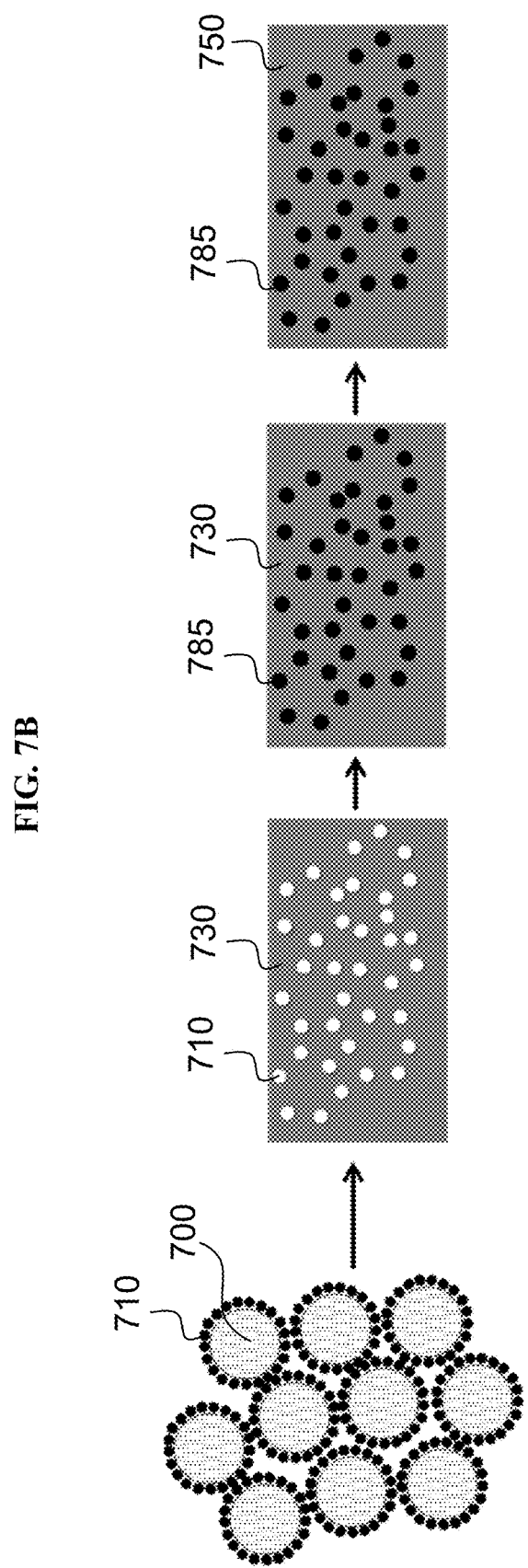
FIG. 7B is a schematic illustration of semi-passive solidification control including contaminant reaction, in which the reacted contaminants remain in the solid.

FIG. 7B is a schematic illustration of semi-passive solidification control including contaminant reaction, in which the reacted contaminants remain in the solid. Nanoparticles 710 are distributed in a melt 730 and react with contaminants (not shown) from the melt 730, to form new nanoparticles/microparticles 785. The reacted contaminants 785 may remain in the solid 750. Again, the powder particles 700 may include ceramic, metal, polymer, glass, or combinations thereof. Nanoparticles 710 may include metal, ceramic, polymer, carbon, or combinations thereof.

Through contaminant removal or rejection, several scenarios are possible. Nanoparticles/microparticles or surface coatings that react with or bind to undesired contaminants may be incorporated into the solidification, in the same phase or a separate solid phase. The reacted nanoparticles/microparticles or surface coatings may be rejected during solidification. When portions or select elements present in the nanoparticles/microparticles or coatings react with or bind to contaminants, such portions or elements may be incorporated and/or rejected.

In some embodiments, the functionalized surface reacts upon heating to form a lower-melting-point material compared to the base material, such as through a eutectic reaction. The functionalized surface may be chosen from a material which reacts with the underlying powder to initiate melting at the particle surface, or within a partial volume of the underlying powder. A heat source, such as a laser or electron beam, may be chosen such that the energy density is high enough to initiate the surface reaction and not fully melt the entire functionalized powder. This results in an induced uniform liquid phase sintering at the particle surface. Upon freezing, the structure possesses a characteristic microstructure indicating different compositions and grain nucleation patterns around a central core of stock powder with a microstructure similar to the stock powder after undergoing a similar heat treatment. This structure may later be normalized or undergo post-processing to increase density or improve the properties.

Another possible reaction is a peritectic reaction in which one component melts and this melted material diffuses into a second nanoparticle or microparticle, to form an alloyed solid. This new alloyed solid may then act as a phase-nucleation center, or may limit melting just at the edge of particles.

Figure 3:
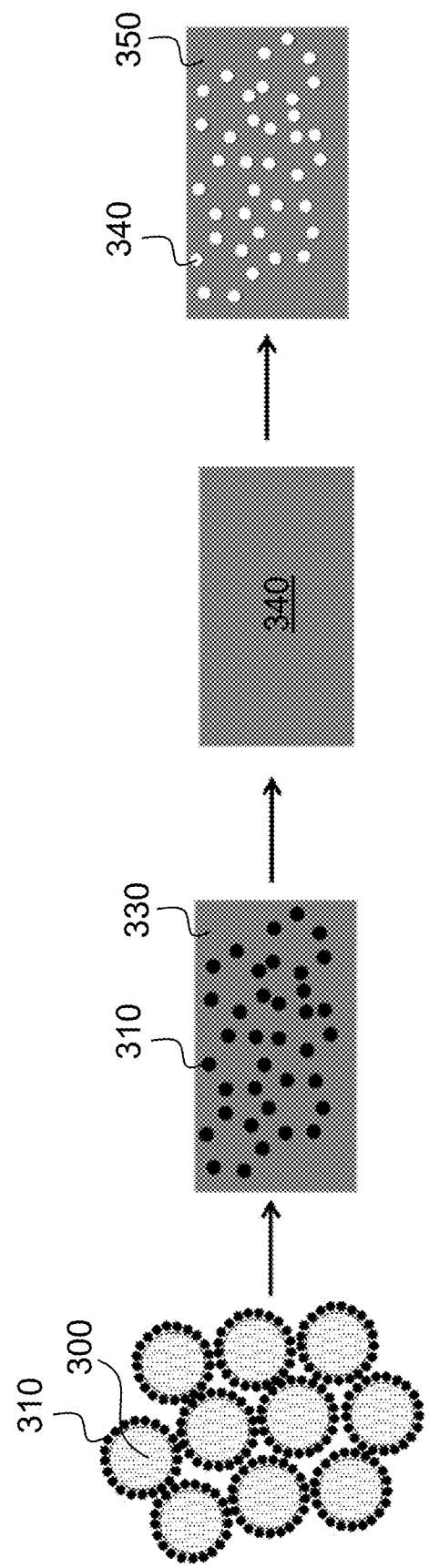
FIG. 3 is a schematic illustration of semi-passive solidification control including peritectic reactions of dissolved nanoparticles upon cooling, leading to nanoparticle formation of dispersoids.

FIG. 3 is a schematic illustration of semi-passive solidification control including peritectic reactions. The powder particles 300 may include ceramic, metal, polymer, glass, or combinations thereof. Nanoparticles 310 may include metal, ceramic, polymer, carbon, or combinations thereof. In FIG. 3, nanoparticles 310 are distributed in a melt 330. At elevated temperatures, the nanoparticles 310 dissolve to form a melt 340. Upon cooling, peritectic reactions take place, leading to nanoparticle formation of dispersoids 340 in a melt 350.

Incorporating nanoparticles into a molten metal may be challenging when the nanoparticles have a thin oxide layer at the surface, since liquid metals typically do not wet oxides well. This may cause the nanoparticles to get pushed to the surface of the melt. One way to overcome the oxide layer on nanoparticles, and the associated wettability issues, is to form the nanoparticles in situ during melt pool formation. This may be achieved by starting with nanoparticles of an element that forms an intermetallic with one component of the base alloy, while avoiding dissolution of the nanoparticles in the melt. Alternatively, binary compound nanoparticles that disassociate at elevated temperatures, such as hydrides or nitrides, may be used since the disassociation reaction annihilates any oxide shell on the nanoparticle.

As noted above, the surface functionalization may be designed to be reacted and rejected to the surface of the melt pool. In embodiments employing additive manufacturing, layered structures may be designed. In some embodiments, progressive build layers and hatchings may be heated such that each sequential melt pool is heated long enough to reject the subsequent rejected layer, thereby producing a build with an external scale and little to no observable layering within the build of the rejected materials. In other embodiments, particularly those which result in a functional or desired material rejected to the surface, heating and hatching procedures may be employed to generate a composite structure with a layered final product. Depending on the build parameters, these may be randomly oriented or designed, layered structures which may be used to produce materials with significantly improved properties.

FIG. 4 is a schematic illustration of semi-passive solidification control in which a melt 430 solidifies with limited movement of assembled nanoparticles 410, thereby allowing the nanoparticles 410 to orient in a three-dimensional structure (plurality of nanoparticles 410 in solidified material 460) which repeats throughout the final solid material 460. The powder particles 400 may include ceramic, metal, polymer, glass, or combinations thereof. Nanoparticles 410 may include metal, ceramic, polymer, carbon, or combinations thereof.

Architected microstructures may be designed in which feature sizes (e.g., distance between nanoparticle nodes) within the three-dimensional network are selected, along with targeted compositions, for an intended purpose. Similarly, layered composite structures may be designed in which feature sizes (e.g., layer thicknesses or distance between layers) are selected, along with targeted compositions, for an intended purpose.

Note that rejection to the surface is not necessarily required to generate layered structures. Functionalized surfaces may be relatively immobile from their initial position on the surface of the base powder. During melting, these functionalized surfaces may act as nucleation sites, as previously mentioned; however, instead of absorption into the melt, they may initiate nucleation at the location which was previously occupied by the powder surface and is not molten. The result is a fine-grained structure evolving from the surface nucleation source, towards the center. This may result in a designed composite structure with enhanced properties over the base material. In general, this mechanism allows for the ability to control the location of desired inclusions through controlled solidification.

In the additive manufacturing of titanium alloys, the problem of microstructural texturing of subsequent layers of molten metals induces anisotropic microstructures and thus anisotropic structural properties. Dispersing stable ceramic nanoparticles in the solidifying layers may produce grain structures with isotropic features which are stable upon repetitive heating cycles. An example is a stable high-temperature ceramic nanoparticle, such as $Al_2O_3$ or TiCN attached to the surface of a Ti-6Al-4V microparticle powder which is subsequently melted, solidified, and then reheated as the next layer of powder is melted on top. The ceramic nanoparticles can induce nucleation of small grains and prevent coarse grains from forming in the direction of the thermal gradient.

Any solidification control method which derives its primary functionality from the surface functionalization of a powdered material can be considered in the scope of this invention. Other methods of control may include multiple types of control described above. An example of a combination of methods includes utilizing rejection to the surface, internal reaction, along with emissivity control. For instance, a part may be processed using additive manufacturing in which a functionalization material is selected to be dissolved into the surface, and reacts to form an insoluble material which is rejected to the surface of the melt pool. This rejected material may then have a low emissivity, which reflects any additional laser radiation, thereby decreasing the local heating and cooling the material quickly to control solidification. The resulting structure is a material with a controlled solidification structure with a low-emissivity surface coating.

In some embodiments, the solid state is a three-dimensional microstructure containing the nanoparticles and/or microparticles as inclusions distributed throughout the solid state.

In some embodiments, the solid state is a layered microstructure containing one or more layers comprising the nanoparticles and/or microparticles.

The method may further include creating a structure through one or more techniques selected from the group consisting of additive manufacturing, injection molding, pressing and sintering, capacitive discharge sintering, and spark plasma sintering. The present invention provides a solid object or article comprising a structure produced using such a method.

FIG. 8 is a schematic illustration of surface melting of a functionalized powder particle 800, in which heat is applied and the nanoparticles 810 react with the surface to form a melt in a volume 810 (outer region of particle) that is less than 100% of the particle 800 volume. The powder particles 800 may include ceramic, metal, polymer, glass, or combinations thereof. Nanoparticles 810 may include metal, ceramic, polymer, carbon, or combinations thereof.

Some variations provide a structure created from the functionalized powder via additive manufacturing. The functionalized powder (with nanoparticles/microparticles or surface coating) may be incorporated into the final structure. In some embodiments, the nanoparticles/microparticles or surface coating are rejected, creating a scale. The scale may be unbonded to the structure. In some embodiments, the scale bonds to the structure or otherwise cannot be readily removed. This may be advantageous, such as to provide a structural enhancement—for instance, rejected ceramic particles may add a hard facing to the final structure. Rejected nanoparticles/microparticles or surface coating may form a multilayer composite, wherein each layer has a different composition. In some embodiments, rejected nanoparticles/microparticles or surface coating forms a spatially variant composition within the bulk of the structure. A three-dimensional architecture may also develop in the final microstructure.

Figure 9:
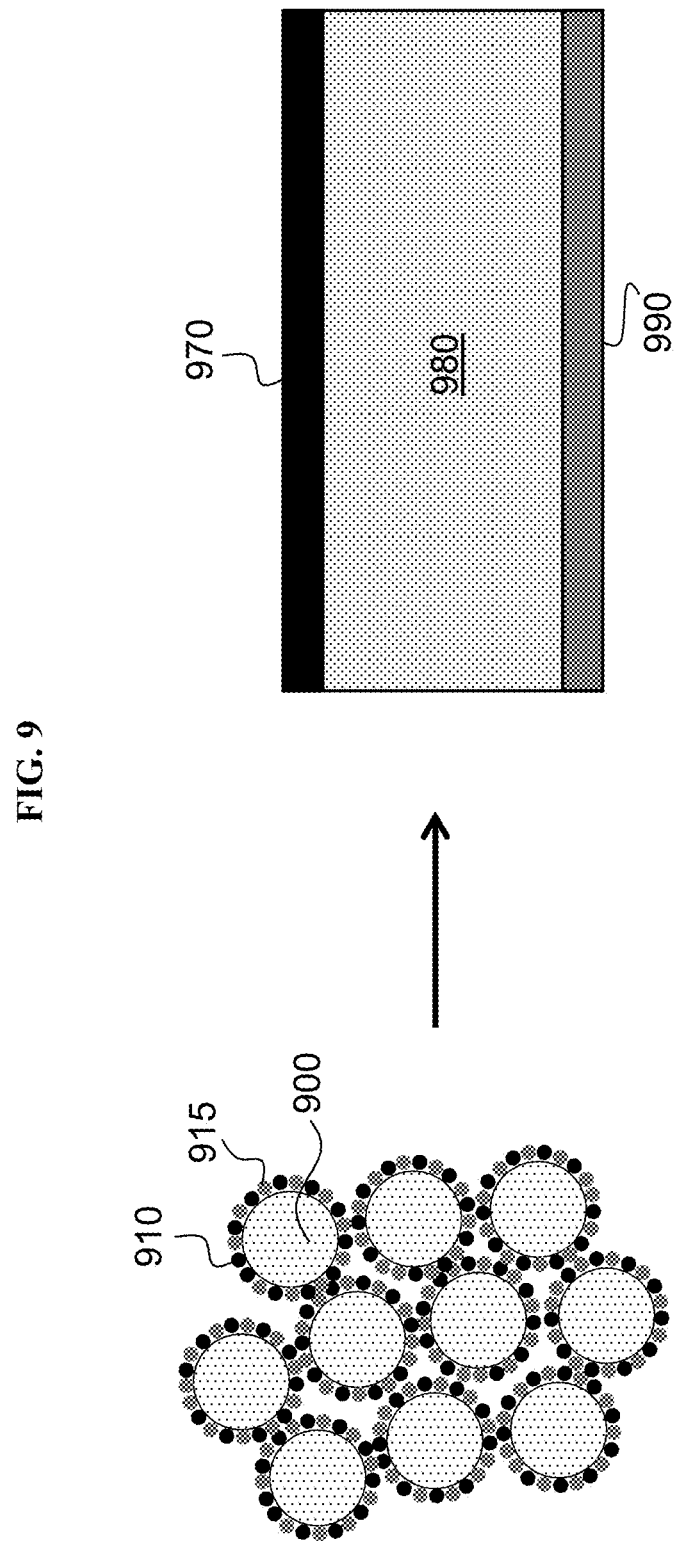
FIG. 9 is a schematic illustration of the formation of a layered composite structure, in which a functionalized powder having two different types of nanoparticles leads to different particle segregation, resulting in a layered structure.

FIG. 9 is a schematic illustration of the formation of a layered composite structure, in which a functionalized powder 900 having two different types of nanoparticles 910, 915 leads to different particle segregation, resulting in a layered structure having layers 970, 980, 990. The powder particles 900 may include ceramic, metal, polymer, glass, or combinations thereof. Nanoparticles 910, 915 may include metal, ceramic, polymer, carbon, or combinations thereof. In the schematic of FIG. 9, layer 970 results from nanoparticles 910 (or reactions thereof), layer 980 results from powder particles 900 (or reactions thereof), and layer 990 results from nanoparticles 915 (or reactions thereof).

Some variations provide a solid object or article comprising at least one solid phase (i) containing a powdered material as described, or (ii) derived from a liquid form of a powdered material as described. The solid phase may form from 0.25 wt % to 100 wt % of the solid object or article, such as about 1 wt %, 5 wt %, 10 wt %, 25 wt %, 50 wt %, or 75 wt % of the solid object or article, for example.

Other variations of the invention provide a solid object or article comprising a continuous solid phase and a three-dimensional network of nanoparticle and/or microparticle inclusions distributed throughout the continuous solid phase, wherein the three-dimensional network blocks, impedes, or redirects dislocation motion within the solid object or article.

In some embodiments, the nanoparticle and/or microparticle inclusions are distributed uniformly throughout the continuous solid phase. The nanoparticle and/or microparticle inclusions may be present at a concentration from about 0.1 wt % to about 50 wt % of the solid object or article, such as about 1, 2, 5, 10, 15, 20, 25, 30, 35, 40, or 45 wt %, for example.

The nanoparticles and/or microparticles have an average maximum particle dimension from about 1 nanometer to about 100 microns. In some embodiments, the average maximum particle dimension is less than 100 nanometers. In these or other embodiments, the nanoparticles and/or microparticles have an average minimum particle dimension from about 1 nanometer to about 1 micron, such as less than 100 nanometers. By "average maximum particle dimension" it is meant the number average of the maximum particle dimensions across all the nanoparticles and/or microparticles present. By "average minimum particle dimension" it is meant the number average of the minimum particle dimensions across all the nanoparticles and/or microparticles present. A perfect sphere has a single dimension, the diameter, which is both the minimum and maximum particle dimension. A cylinder has two characteristic length scales: the length (height) and the diameter. When the cylinder is in the form of a long rod, the maximum particle dimension is the length and the minimum particle dimension is the diameter. In various embodiments, the nanoparticles and/or microparticles may have an average maximum particle dimension of about, or less than about, 10, 25, 50, 75, 100, 150, 200, 250, 300, 400, 500, 600, 700, 800, 900, or 1000 nanometers. In various embodiments, the nanoparticles and/or microparticles may have an average minimum particle dimension of about, or less than about, 5, 10, 25, 50, 75, 100, 150, 200, 250, 300, 400, or 500 nanometers.

The solid phase may be fabricated from a first material selected from the group consisting of ceramic, metal, polymer, glass, and combinations thereof. The nanoparticles and/or microparticles may be fabricated from a second material selected from the group consisting of metal, ceramic, polymer, carbon, and combinations thereof. The second material may be the same as or different than the composition of the solid phase.

In some embodiments, light elements are incorporated into the system. For example, the particle surface (or the surface of nanoparticles or microparticles present on the powder particles) may be surface-reacted with an element selected from the group consisting of hydrogen, oxygen, carbon, nitrogen, boron, sulfur, and combinations thereof. For example, reaction with hydrogen gas may be carried out to form a metal hydride. Optionally, the particle or a particle coating further contains a salt, carbon, an organic additive, an inorganic additive, or a combination thereof. Certain embodiments utilize relatively inert carbides that are incorporated (such as into steel) with fast melting and solidification.

Methods of producing surface-functionalized powder materials are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein. These disclosures relate to methods of coating certain materials onto micropowders, in some embodiments.

For example, as described in U.S. patent application Ser. No. 14/860,332, coatings may be applied using immersion deposition in an ionic liquid, depositing a more-noble metal on a substrate of a less noble, more electronegative metal by chemical replacement from a solution of a metallic salt of the coating metal. This method requires no external electric field or additional reducing agent, as with standard electroplating or electroless deposition, respectively. The metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof.

Organic ligands may be reacted onto a metal, in some embodiments. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly(carboxymethylcellulose), poly(D- or L-lysine), poly(L-glutamic acid), poly(L-aspartic acid), poly(glutamic acid), heparin, dextran sulfate, l-carrageenan, pentosan polysulfate, mannan sulfate, chondroitin sulfate, and combinations or derivatives thereof.

The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium.

Some possible powder metallurgy processing techniques that may be used include but are not limited to hot pressing, low-pressure sintering, extrusion, metal injection molding, and additive manufacturing.

The final article may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

The final article may be selected from the group consisting of a sintered structure, a coating, a weld filler, a billet, a net-shape part, a near-net-shape part, and combinations thereof. The article may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

In some embodiments of the invention, the coated particles are fused together to form a continuous or semi-continuous material. As intended in this specification, "fused" should be interpreted broadly to mean any manner in which particles are bonded, joined, coalesced, or otherwise combined, at least in part, together. Many known techniques may be employed for fusing together particles.

In various embodiments, fusing is accomplished by sintering, heat treatment, pressure treatment, combined heat/pressure treatment, electrical treatment, electromagnetic treatment, melting/solidifying, contact (cold) welding, solution combustion synthesis, self-propagating high-temperature synthesis, solid state metathesis, or a combination thereof.

"Sintering" should be broadly construed to mean a method of forming a solid mass of material by heat and/or pressure without melting the entire mass to the point of liquefaction. The atoms in the materials diffuse across the boundaries of the particles, fusing the particles together and creating one solid piece. The sintering temperature is typically less than the melting point of the material. In some embodiments, liquid-state sintering is used, in which some but not all of the volume is in a liquid state.

When sintering or another heat treatment is utilized, the heat or energy may be provided by electrical current, electromagnetic energy, chemical reactions (including formation of ionic or covalent bonds), electrochemical reactions, pressure, or combinations thereof. Heat may be provided for initiating chemical reactions (e.g., to overcome activation energy), for enhancing reaction kinetics, for shifting reaction equilibrium states, or for adjusting reaction network distribution states.

Some possible powder metallurgy processing techniques that may be used include, but are not limited to, hot pressing, sintering, high-pressure low-temperature sintering, extrusion, metal injection molding, and additive manufacturing.

A sintering technique may be selected from the group consisting of radiant heating, induction, spark plasma sintering, microwave heating, capacitor discharge sintering, and combinations thereof. Sintering may be conducted in the presence of a gas, such as air or an inert gas (e.g., Ar, He, or $CO_2$), or in a reducing atmosphere (e.g., $H_2$ or CO).

Various sintering temperatures or ranges of temperatures may be employed. A sintering temperature may be about, or less than about, 100° C., 200° C., 300° C., 400° C., 500° C., 600° C., 700° C., 800° C., 900° C., or 1000° C.

A sintering temperature is preferably less than the reactive-metal melting temperature. In some embodiments, a sintering temperature may be less than a maximum alloy melting temperature, and further may be less than a minimum alloy melting temperature. In certain embodiments, the sintering temperature may be within the range of melting points for a selected alloy. In some embodiments, a sintering temperature may be less than a eutectic melting temperature of the particle alloy.

At a peritectic decomposition temperature, rather than melting, a metal alloy decomposes into another solid compound and a liquid. In some embodiments, a sintering temperature may be less than a peritectic decomposition temperature of the metal alloy. If there are multiple eutectic melting or peritectic decomposition temperatures, a sintering temperature may be less than all of these critical temperatures, in some embodiments.

In some embodiments pertaining to aluminum alloys employed in the microparticles, the sintering temperature is preferably selected to be less than about 450° C., 460° C., 470° C., 480° C., 490° C., or 500° C. The decomposition temperature of eutectic aluminum alloys is typically in the range of 400-600° C. (Belov et al., *Multicomponent Phase Diagrams: Applications for Commercial Aluminum Alloys*, Elsevier, 2005), which is hereby incorporated by reference herein.

A solid article may be produced by a process selected from the group consisting of hot pressing, cold pressing and sintering, extrusion, injection molding, additive manufacturing, electron beam melting, selected laser sintering, pressureless sintering, and combinations thereof. The solid article may be, for example, a coating, a coating precursor, a substrate, a billet, a net shape part, a near net shape part, or another object.

The present invention is applicable to additive manufacturing and welding applications, along many other applications. Some embodiments provide powder metallurgy processed parts that are equivalent to machined parts. Some embodiments provide surface coatings that resist corrosion, which coatings are formed during the part fabrication instead of as an extra step.

Other commercial applications include, but are not limited to, complex component integration (reduce number of individual parts used to make one assembly), reduced-weight optimized structures, battery and fuel cell electrodes, catalyst materials, lightweight fillers, complex tooling, and improved performance of existing parts.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A powdered material comprising a plurality of particles, wherein said particles are fabricated from a first material, wherein each of said particles has a particle surface area that is surface-functionalized with a second material containing nanoparticles and/or microparticles, wherein said second material is different than said first material, wherein the melting point of said second material is higher than the melting point of said first material, and wherein said nanoparticles and/or microparticles are selected for epitaxial fit of crystal lattice parameters with said first material.

2. The powdered material of claim 1, wherein said first material is selected from the group consisting of ceramic, metal, polymer, glass, and combinations thereof.

3. The powdered material of claim 1, wherein said second material is selected from the group consisting of metal, ceramic, polymer, carbon, and combinations thereof.

4. The powdered material of claim 1, characterized in that on average at least 1% of said particle surface area is surface-functionalized with said nanoparticles and/or said microparticles.

5. The powdered material of claim 1, wherein said particles are present as a loose powder, a paste, a suspension, a green body, or a combination thereof.

6. The powdered material of claim 1, wherein said particles have an average particle size from about 1 micron to about 1 centimeter.

7. The powdered material of claim 1, wherein said nanoparticles and/or microparticles have an average maximum particle dimension from about 1 nanometer to about 100 microns.

8. The powdered material of claim 1, wherein said nanoparticles and/or microparticles have an average minimum particle dimension from about 1 nanometer to about 1 micron.

9. The powdered material of claim 1, wherein said nanoparticles and/or microparticles are nucleation sites within said powdered material.

10. The powdered material of claim 1, wherein said nanoparticles and/or microparticles are characterized by an average diameter that is less than 20% of an average diameter of said particles.

11. The powdered material of claim 1, wherein said second material is in the form of an intermittent coating.

* * * * *